Jan. 12, 1965 P. BERGONZO 3,164,887
AUTOMATIC MACHINE TOOL TURRET
Filed Sept. 5, 1961
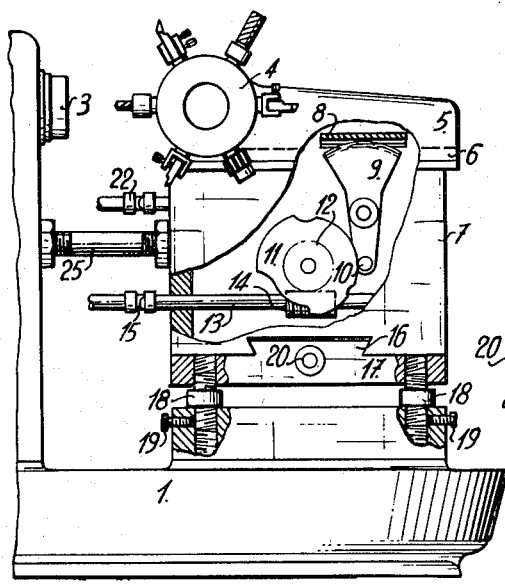
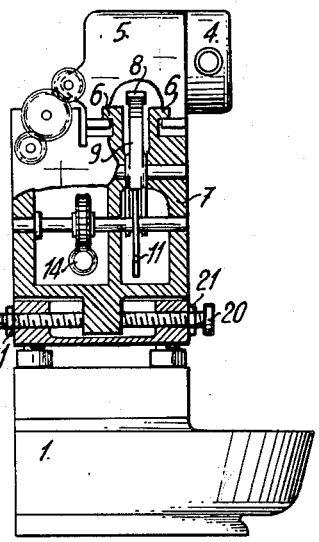
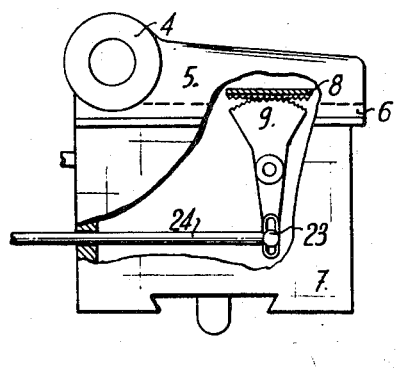
INVENTOR
PIERRE BERGONZO
By Irwin S. Thompson
ATTY.

United States Patent Office 3,164,887
Patented Jan. 12, 1965

3,164,887
AUTOMATIC MACHINE TOOL TURRET
Pierre Bergonzo, 117 Rte. de la Capite, Cologny,
Geneva, Switzerland
Filed Sept. 5, 1961, Ser. No. 135,847
Claims priority, application Switzerland, Oct. 7, 1960,
1,258/60
1 Claim. (Cl. 29—39)

The present invention concerns machine-tools of the type comprising a workpiece carrying spindle and a tool carrier located in front of said spindle, in which the tool in working position has to be rigorously centered on the axis of rotation of the spindle. The most important machine tools of this type are the automatic lathes. Such lathes often contain a tool carrier apparatus disposed in front of the spindle, constituted either by a turret head or by an apparatus equipped with one or more tool carrying spindles supported on a transversal slide carried in turn by a longitudinal slide. The manufacture of these automatic lathes is rendered very difficult by the fact that the axis of any tool disposed in a working position on the tool carrier must be rigorously situated along the prolongation of the axis of rotation of the workpiece carrying spindle. In fact, this alignment of the tool determines the machining precision of the lathe. The manufacturers of automatic lathes have to be able to guarantee a precision of the order of magnitude of one hundredth of a millimeter. It is thus necessary that the alignment of the spindle, and of the tool-carrier apparatus located in front of the spindle, be absolutely correct, that is to say it must involve a precision of less than 2 or 3 thousandths of a millimeter.

It is practically impossible during the assembling of the lathe to obtain a precision of this order of magnitude, since the turret head is carried by a slide displaceable along slides fixed on the frame of the lathe. Difficulties in aligning the tools properly invariably arise, because the turret head mounting assembly involves at least three to four different pieces and it is evident that the variations of the total dimension of such an assembly are much greater than one hundredth of a millimeter.

One solution actually used consists in providing a headstock fixed on the frame of the lathe. First the front tool carrier is assembled, and then the bearing face of the headstock (which was intentionally made with too large a dimension) is scraped down. In this manner the height of the axis of the spindle is adjusted so that it will be located in the same horizontal plane (parallel to the slides) containing the axis of a tool carried by the front tool carrier and placed in working position. Then by translation of the headstock, the axis of the spindle is brought to the vertical plane containing the axis of a tool carried by the front tool carrier located in working position. The headstock is then fixed on the frame in that rigorously centered position.

Another known procedure is to fix the headstock rigidly on the frame and then to adjust the height of the front tool carrier to its exact value by milling the slides of this tool carrier. Next, mounting apertures intended to receive the tools are drilled in the turret head by means of a tool fixed on the workpiece spindle. In this way, a perfect centering of the tools in working position with respect to the spindle may be ensured. However, this procedure, although more economical than the first solution described, is not rational. In fact, the heads of the turret will not be interchangeable, each being individually machined after assembly on the lathe, so that in case of damage of any turret head, it is necessary to mount a partially pre-machined head and to proceed on the lathe itself to carry out all the above mentioned operations over again. This lack of interchangeability is at present unacceptable since it requires the services of a skilled worker for the replacement of a damaged turret head.

It is evident that such methods requiring exclusively highly skilled man power and necessitating operations of long duration is very onerous and reduces the rate of production of such lathes.

An object of the present invention is to provide a machine tool comprising a frame, carrying among others two essential members, on the one hand a headstock on which a workpiece carrying spindle is pivoted and on the other hand a front tool carrier apparatus carried by a slide, in which at least one of the two essential members of said machine-tool is carried by an auxiliary frame, the position of which is adjustable with respect to the frame of the machine-tool along two orthogonal directions.

The annexed drawing illustrates schematically and by way of example one embodiment of a lathe according to the invention, as well as an alternate embodiment thereof.

FIG. 1 is a side view of a first embodiment of the invention, certain parts being removed.

FIG. 2 is a front view, partially in section, of this embodiment, the headstock being withdrawn.

FIG. 3 illustrates an alternate embodiment of the device for driving the front tool carrier slide.

In reference to FIGS. 1 and 2, the automatic lathe according to the invention comprises a frame 1 carrying the two essential members, a headstock 2 and a front tool carrier 4 located in front of the spindle. This headstock 2 carries a workpiece carrying spindle 3 and might be either set on the frame 1, or made out of only one piece of fabrication with the said frame 1.

The front tool holder 4, constituted by a capstan head in the present example, is mounted on a longitudinal slide 5 through the intermediary of slides 6 on an auxiliary frame 7 in the inside of which a part of the control mechanism of the slide 5 is disposed.

This control mechanism comprises, among other members, a rack 8 carried by the slide 5 and meshing with a toothed sector 9 pivoted on the auxiliary frame 7. The extremity of sector 9 carries a roller 10 bearing on a cam 11 which is fast with a helical wheel 12 actuated through a shaft 13 by means of a tangent screw 14. This shaft 13 is connected, through the intermediary of a universal joint 15, for example, to a control member (not shown) serving to control the longitudinal displacements of the slide 5.

The auxiliary frame 7 is assembled on frame 1 of the lathe so as to be displaceable with respect to the frame 1 along two orthogonal directions. This auxiliary frame 7 is mounted by means of a slide 16, perpendicular to the slides 6 of the slide 5, on an adjustment plate or slide 17 connected by means of lifting members 18 to the frame 1 of the lathe.

In the example shown, these lifting members are constituted by mechanical lifting jacks comprising a first part screwed in the frame 1 and a second part screwed in the auxiliary frame 7 but with an inverse pitch with respect to that of the first part.

A locking device for retaining auxiliary frame 7, and thus the tool, in the aligned or adjusted position is constituted, on the one hand, by screws 19 fixing the position of the lifting members 18 and, on the other hand, by screws 20 and counter locks 21 locking the position of the auxiliary frame 7 with respect to the slide 17.

Fixing means, constituted by tie rods 25 in the represented example, enable the auxiliary frame 7 to be fixed rigidly and in a permanent way the auxiliary frame 7 to the headstock 2. In this way, the relative position of said headstock 2 and of the auxiliary frame 7 cannot be modified even when, in the course of the machining of a workpiece, the frame is subjected to very great forces.

The automatic lathe comprises further, the same as the existing lathes, a capstan head indexing device (not shown) which is connected, though the intermediary of a universal coupling 22, for example, to a control member for controlling the indexing of the capstan head.

The lathe according to the present invention may be manufactured in large numbers with great facility. In fact, all the constitutive parts can be manufactured in series, then assembled without having to take account for the exact relative position of the spindle and of the front tool holder. The alignment of the spindle and of the tool in the working position of the front tool holder is then effected vertically by means of the lifting members 18 and laterally by sliding the auxiliary frame 7 on the slide 17. Then, when the centering is correct, the auxiliary frame 7 is securely held in the aligned position by means of the above described locking device.

In the variant illustrated at FIG. 3, the control mechanism for slide 5 comprises also a rack 8 in mesh with a toothed sector 9 pivoted on the auxiliary frame 7. However, this toothed sector 9 is directly connected through a coupling 23 to a shaft 24 mechanically connected to the corresponding control member. The coupling 23 compensates for the relative displacements of the control member and of the toothed sector 9 which take place when the alignment of the tools in working position of the front tool holder and of the spindle is performed.

One embodiment and a variant have been described by way of example but it goes without saying that numerous other embodiments could be provided without departing from the scope of the claimed protection.

Particularly, the way in which the auxiliary frame 7 is mounted on the frame 1 may be anyone so long as it is displaceable along two orthogonal directions which are themselves perpendicular to the slides 6 of the slide 5.

It is evident that in other embodiments, the headstock could be carried by an auxiliary frame adjustable, in the way just described, along two orthogonal directions with respect to the frame of the machine. In this case, the front tool holder slide could be, or not, carried by an auxiliary frame in the way described herebefore.

All the other devices of the lathe, whether described herein or not, may be of any suitable known design, so long as all mechanical connections between the frame 1 or the headstock 2 and the auxiliary frame 7, include transmission means enabling the transmission of the movement in spite of the relative displacements of the frame 1 and of the auxiliary frame 7.

The lathes according to the present invention thus provide a great simplification of manufacturing with respect to all the existing lathes comprising a front tool holder, enabling the time and cost of their manufacture to be significantly reduced. Further the present invention provides an interchangeable front tool holder which is a great advantage not only during the manufacture of the lathes but also for any necessary replacement of a front tool holder on a lathe in service.

I claim:

A lathe tool support structure comprising in combination a main bed frame, a tool means mounted on a slide, a auxiliary frame having an upper face which includes guideways on which said slide is mounted for reciprocal movement in a first direction, means for moving said slide along said guideways, an adjustment plate disposed between said bed frame and said auxiliary frame, said adjustment plate having slideway means on its upper surfaces, said auxiliary frame having on its lower surfaces slideway means complementary in form to said slideway means of said adjustment plate and slidably engaging said slideway means of said adjustment plate for movement in a second direction, means for traversing said auxiliary frame relative to said adjustment plate, locking means for releasably securing together said auxiliary frame and said adjustment plate, lifting means acting between said main bed frame and said adjustment plate for varying the height of said adjustment plate relative to said bed frame, and means for releasably securing said adjustment plate in any of a plurality of vertically adjusted positions relative to said bed frame.

References Cited by the Examiner

UNITED STATES PATENTS

| | | | |
|---|---|---|---|
| 944,480 | 12/09 | Cunningham | 82—28 |
| 1,005,504 | 10/11 | Blugok | 82—28 |
| 1,227,486 | 5/17 | Newman | 82—31 |
| 1,327,604 | 1/20 | Booth | 82—28 |
| 1,369,152 | 2/21 | Witt | 82—31 |
| 2,391,154 | 12/45 | Groene | 82—31 |
| 2,500,880 | 3/50 | Solomon | 90—163 |

RICHARD H. EANES, JR., *Primary Examiner.*